March 9, 1926.  
M. A. FLYNN  
DEVICE FOR LOCATING INNER TUBES IN MOLDS  
Filed Nov. 5, 1925
1,576,107
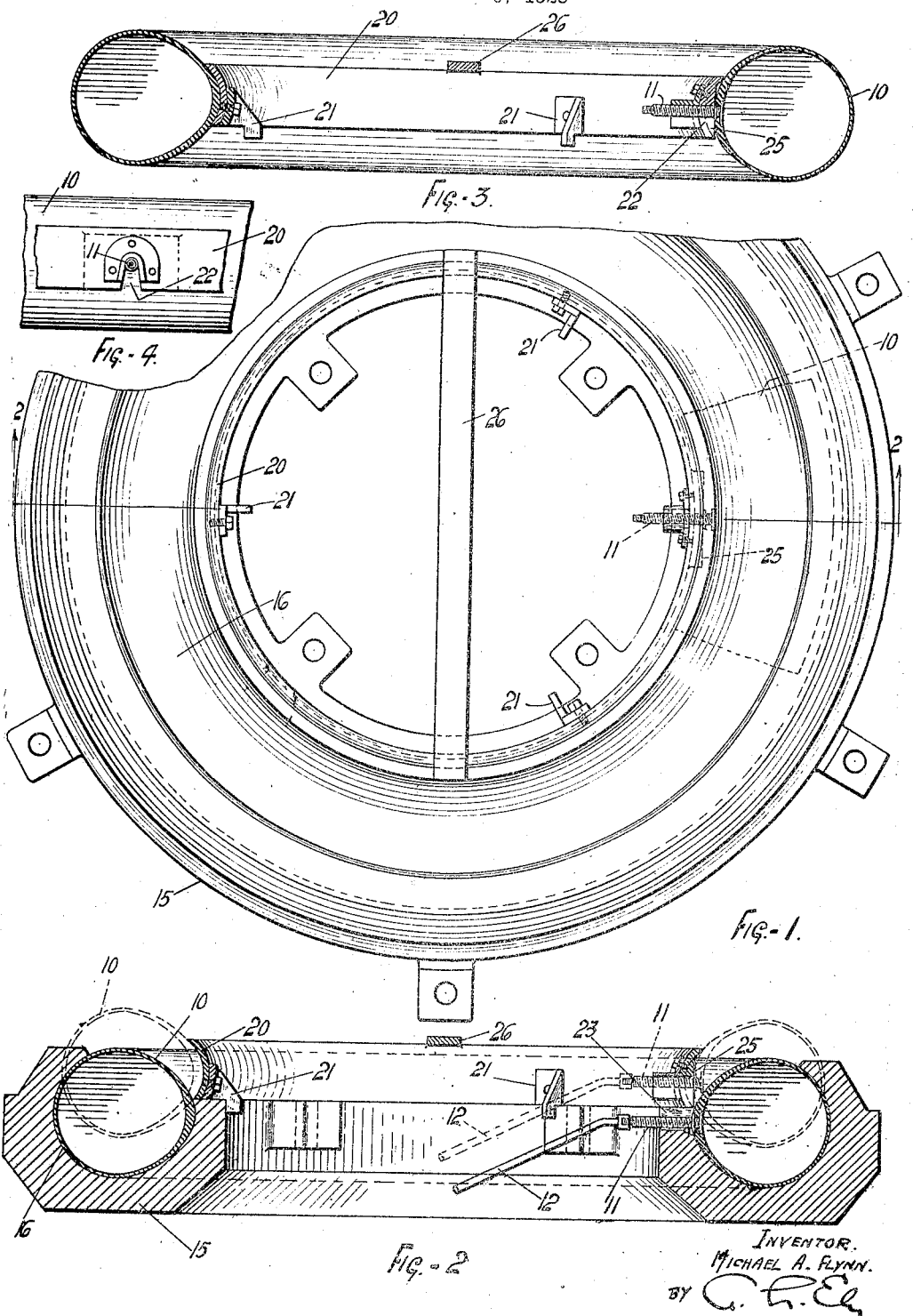

Patented Mar. 9, 1926.

1,576,107

UNITED STATES PATENT OFFICE.

MICHAEL A. FLYNN, OF AKRON, OHIO.

DEVICE FOR LOCATING INNER TUBES IN MOLDS.

Application filed November 5, 1925. Serial No. 66,845.

*To all whom it may concern:*

Be it known that I, MICHAEL A. FLYNN, a citizen of the United States, and a resident of Akron, county of Summit, State of Ohio, have invented certain new and useful Improvements in Devices for Locating Inner Tubes in Molds, of which the following is a specification.

This invention relates to the manufacture of inner tubes of penumatic tires and particularly to the manufacture of tubes which are cured while in circular form in molds and while under internal pressure.

The object of the invention is to provide a device which will operate as a support and centering means for the inner tube so that it may be quickly and accurately placed in the mold. In this way burning or scorching of the tube in spots is prevented. In addition, the device affords a means for supporting the tube in such close relationship to the mold that the connection for the internal pressure can be made before the tube is placed in the mold and may be made quicker and easier than after the tube is in the mold.

These and other objects and advantages will be apparent to those skilled in the art to which this invention pertains, it being understood that changes and modifications may be made within the scope of the invention as set forth in the claims attached hereto.

In the drawings:

Figure 1 is a plan view of a lower or principal tube mold section showing the placing ring in position and a fragment of a tube thereon;

Figure 2 is a cross-section on the line 2—2 of Figure 1;

Figure 3 is a cross-section through the ring with the tube in place thereon; and Figure 4 is a fragmentary view of the inner surface of the ring at the valve stem.

The inner tube which is to be cured is shown at 10, the valve stem, which is used for the admission of internal pressure, being shown at 11, the flexible pipe through which the pressure is admitted to the tube being shown at 12.

The lower section of the mold is shown at 15 and is provided with a tube cavity 16 which encircles approximately three-quarters of the tube cross-section, the mold being closed by an upper section which is not shown. Heretofore, the workman has inserted the tube within the mold unaided by any devices for locating or centering the tube, and as a result the operation has been both laborious and detrimental to the tube as portions have contacted the hot mold before the entire tube is seated and the tube has been injured. By the use of the present invention, the tube is supported in partially inflated condition upon a placing and positioning ring which is provided with means whereby the ring can be accurately centered so that the tube is concentric with the mold cavity. The tube is first connected with the source of internal pressure and the workman can then slip the tube off the centering ring, whereupon it seats accurately and quickly in the molding cavity.

The ring, which has been referred to, is indicated by the numeral 20, its outer surface being concave in cross-section so that it affords a seat for the inner circumference of the tube. A series of lugs 21 are attached to the inner surface of the ring and fit over the inner circumference of the mold, as shown in Figure 2, so that the tube is accurately centered with respect to the cavity 16. A slot 22 is formed in the ring through which the valve stem passes, the slot registering with a slot 23 in the lower section of the mold. A housing or guide plate surrounds three sides of the slot, and the outer surface of the ring about the slot is flattened, as shown at 25, so that the valve may pass out of the ring. A bar 26 extending across the ring affords an easy means of handling the ring.

It will be observed that a ready and easily operated device is provided for the purposes set forth. Partially inflated tubes may be mounted upon rings and placed in the molds as required. The tube is always assured of an accurate and careful fit and there is no danger of pinching the tube between the mold sections due to uneven or careless positioning of the tube within the mold.

What is claimed is:

1. In combination with a tube mold having a cavity therein, a ring which is concave upon its outer surface to provide a seat for the inner periphery of the inner tube, and means to center the ring with respect to the mold with the seat therein in alignment with the mold cavity.

2. In combination with a tube mold having a cavity therein, a ring which is provided with a seat upon its outer surface upon which a partially inflated uncured inner tube will rest, and means to center the ring upon the mold with the inner tube over the cavity.

3. In combination with a tube mold having a cavity therein, a ring which is provided with a seat upon its outer surface upon which a partially inflated uncured inner tube will rest, and means to center the ring upon the mold with the inner tube over the cavity, the ring and the mold having registering slots to permit the passage of the valve stem.

4. In combination with a tube mold having a cavity therein, a ring which is provided with a seat upon its outer surface upon which a partially inflated uncured inner tube will rest, and means to center the ring upon the mold with the inner tube over the cavity, the ring having a slot to permit the passage of the valve stem.

5. A device for use in placing inner tubes within molds, comprising a ring having a transverse slot therein and which is provided upon its outer surface with a concave seat except about the region of the slot which is flattened to permit the passage of the valve.

6. A device for use in placing inner tubes within molds, comprising a ring having a transverse slot therein and which is provided upon its outer surface with a concave seat except about the region of the slot which is flattened to permit the passage of the valve, and centering devices on the inner circumference of the ring.

7. A device for use in placing inner tubes within molds, comprising a ring having a seat for the inner circumference of the tube, and lugs attached to the ring by which it may be centered with respect to the mold.

8. A device for use in placing inner tubes within molds, comprising a ring having a seat for the inner circumference of the tube, a transverse slot to permit the passage of the valve stem, and lugs attached to the ring by which it may be centered with respect to the mold.

M. A. FLYNN.